Patented Apr. 19, 1932

1,854,502

UNITED STATES PATENT OFFICE

LOUIS BERMAN, OF NEW YORK, N. Y.

PARATHYROID EXTRACTION

No Drawing.  Application filed December 10, 1925.  Serial No. 74,648.

The present invention relates to the production of parathyroid products.

In my prior applications, Ser. No. 712,552 filed May 12, 1914, Ser. No. 715,057 filed May 22, 1924 and Ser. No. 49,643 filed Aug. 11, 1925, various methods for the production of new parathyroid products from the parathyroid glands have been disclosed, the particular physiological properties of these products being to increase the calcium content of the blood and decrease nervous irritability.

The present invention provides a new and improved process for making the new parathyroid product, which I designate parathyrin. In the new method I employ acid and alcohol together as the extractive solvent.

The following specific example will illustrate the improved method of the present invention.

Frozen external parathyroid glands of steers are carefully trimmed of fat and comminuted with sand. The comminuted glands are then covered with an 85% ethyl alcohol solution containing 5% by volume of sulfuric acid in the proportion of one liter of the alcohol-acid for one-tenth of a kilogram of the glands. This mixture is then placed in a revolving shaking machine and extracted for about 48 hours. Filtration, first through gauze and then through filter paper, is effected, the filtrate finally becoming clear when refiltered through the same filter paper. The filtrate is then made neutral to litmus by the addition of sodium hydroxide which causes the formation of a large amount of white precipitate consisting mainly of sodium sulfate. This white precipitate is removed by filtration. The alcohol is then removed from the filtrate by distillation in vacuo. Upon this removal a precipitation occurs and the precipitate is removed by filtration. The filtrate contains the product sought, the specific calcium-mobilizing substance which I designate parathyrin. This filtrate gives a definitely negative reaction with the biuret test for protein.

The proportions of alcohol and acid can be varied. For example, an extract similarly prepared with 90% alcohol and 5% sulfuric acid will be about equally as active as a preparation using the proportions stated above. Also other acids may be used in place of sulfuric acid.

The use of alcohol and acid together with the procedure described, appears to effect the extraction of the hormone, free from protein, or to extract a lipin hormone compound with resulting splitting of the hormone from this compound, so that the hormone is obtained directly in a form free from protein. Moreover, when the extract is neutralized, the sulfate formed by the neutralization of the acid with alkali, is insoluble in the alcohol solution and readily removed in precipitated form, so that further treatment to remove protein or salt is unnecessary.

What I claim and desire to secure by Letters Patent is:

A method of producing a parathyroid product from parathyroid glands which comprises extracting parathyroid glands by agitating with an 85% ethyl alcohol solution containing 5% by volume of sulfuric acid and purifying the extract by filtering, and neutralizing the acid before distilling off the alcohol, and then distilling off the alcohol.

In testimony whereof I affix my signature.

LOUIS BERMAN.